United States Patent Office 3,257,292
Patented June 21, 1966

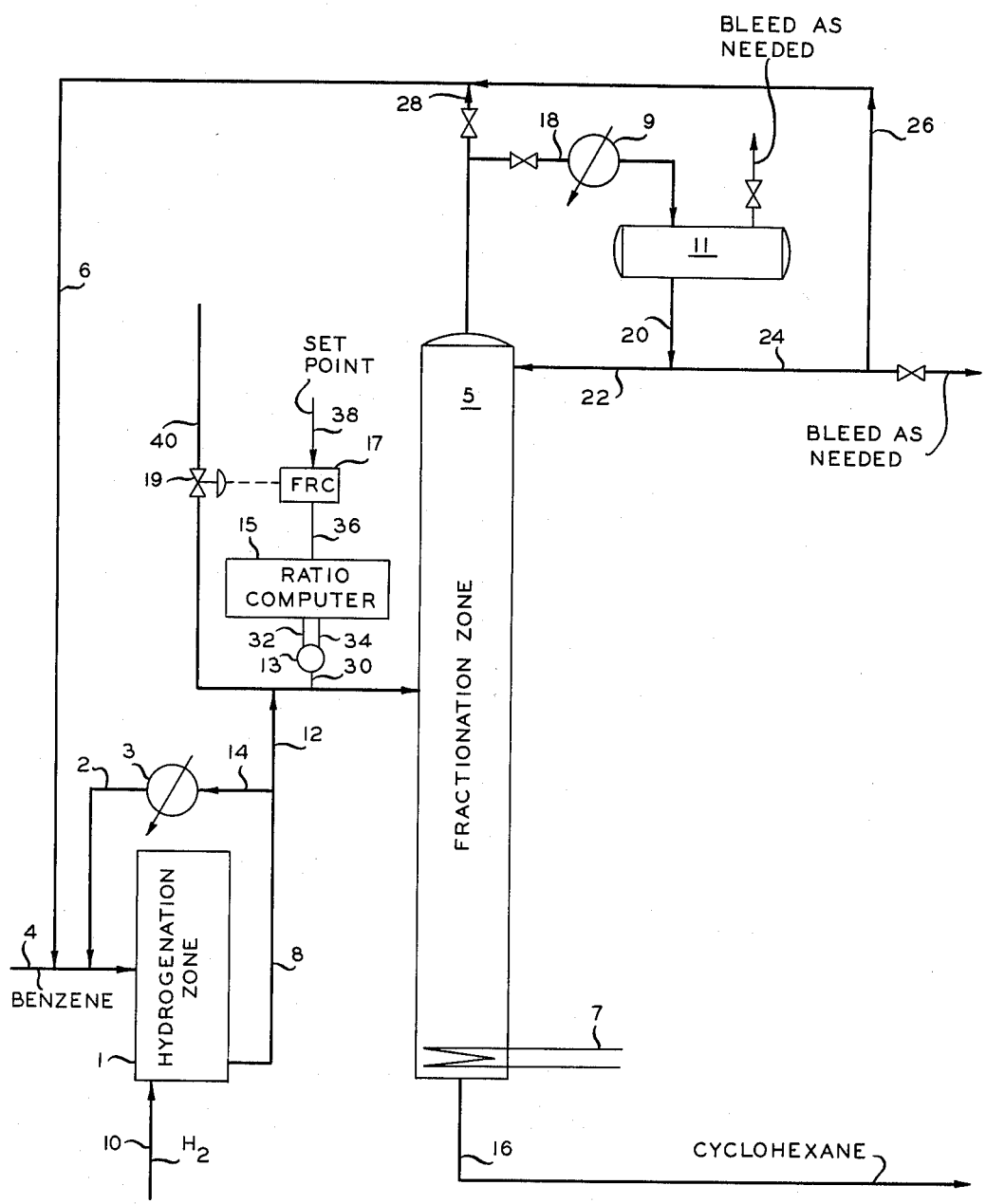

3,257,292
SEPARATION OF CYCLOHEXANE AND BENZENE BY DISTILLATION
John T. Cabbage, Bartlesville, Okla., assignor to Phillips Petroleum Company, a corporation of Delaware
Filed Aug. 19, 1963, Ser. No. 302,821
4 Claims. (Cl. 203—3)

This invention relates to the conversion of hydrocarbons. In one of its aspects this invention relates to an improved hydrogenation process for producing substantially pure cyclohexane from a high purity benzene feed stream.

According to this invention, benzene is subjected to catalytic hydrogenation in the presence of a saturated hydrocarbon inert to the hydrogenation catalyst and the resulting hydrogenation effluent is subjected to distillation for the removal of impurities from the resulting cyclohexane.

Large quantities of cyclohexane are used in the production of certain synthetic fibers and as solvents in many processes. The present demand for cyclohexane has exceeded the quantity recoverable from cyclohexane-containing hydrocarbon streams by separation means. Further, fractionation of cyclohexane-containing streams does not yield substantially pure cyclohexane product, due to close boiling isoheptanes therein. Therefore, manufacturers have had to synthesize cyclohexane from other hydrocarbons. One synthesis method generally used is the isomerization of methylcyclopentane. In this method, a hydrocarbon stream containing benzene, normal hexane, methylcyclopentane, etc., is used as feed. The benzene must be removed from the feed to prevent large consumption of the synthesis catalyst and reduction of the desirable reactions by uneconomical amounts. The small quantity of benzene in the feed is removed by hydrogenating it to cyclohexane prior to the isomerization reaction. A more economical method to employ is simply hydrogenation of a substantially pure benzene feed stream, when such a stream is available. However, the hydrogenation reaction inevitably allows some residual benzene to be in the cyclohexane product. The ever-increasing demands and uses for cyclohexane are constantly requiring up-grading the specification purity of the synthesized cyclohexane product. Therefore, the manufacturers are faced with the problem of improving the purity of synthesized cyclohexane. When benzene is present with the cyclohexane, the manufacturer is faced with a difficult separation problem due to the closeness of the boiling points of benzene and cyclohexane which eliminates the use of the more common separation operations, such as fractional distillation.

Accordingly, it is an object of this invention to provide an improved process for the conversion of hydrocarbons. Another object of this invention is to provide an improved process for the conversion of benzene to cyclohexane. Still another object of this invention is to provide a method and apparatus for the production of substantially pure cyclohexane.

Other aspects, objects and advantages of the invention will be apparent in consideration of this disclosure, the drawing, and the appended claims.

In accordance with this invention, a substantially pure benzene feed stream is converted to cyclohexane by catalytic hydrogenation in the presence of normal hexane, which is inert to the hydrogenation catalyst. The hydrogenation reaction is carried out by contacting the benzene feed, as vapor phase, with a hydrogenation catalyst and hydrogen under suitable conditions of elevated temperature, usually between about 380° to 500° F. At temperatures below 380° F., liquid may be present and at temperatures above 500° F., demethylation can occur. Pressure does not appreciably affect the hydrogenation reaction and the actual pressure employed is established principally by the partial pressure of the hydrogen present. Usually the liquid hourly space velocity is between about 1 and about 3 cubic feet of liquid feed per cubic foot of catalyst per hour. Operation with an excess of hydrogen is preferred, the hydrogen-to-hydrocarbon mol ratio is about 4:1 to about 16:1, preferably about 9:1. This reaction is generally conducted in a fixed bed catalyst zone; however, moving bed and fluidized bed catalyst zones may be employed.

Any catalyst suitable for hydrogenation is applicable to this invention. Examples of such catalysts include nickel, platinum, tungsten, and molybdenum. These materials are generally finely divided and are on a porous support such as precipitated alumina, alumina-silica coprecipitate or kieselguhr. A typical catalyst is nickel in the range of 25 to 60 weight percent on kieselguhr.

The use of normal hexane, which is inert to the hydrogenation catalyst in this reaction improves the operation of same by absorbing some of the heat of reaction.

The hydrogenation reaction effluent containing substantially cyclohexane with minor amounts of benzene and normal hexane is purified in a distillation zone. The distillation zone can be operated at a top temperature of about 250° F. at 60 p.s.i.g. However, other temperature-pressure conditions can be used as will be recognized by those skilled in the art. The fractionation is effected to produce pure cyclohexane bottoms product and an overhead essentially of benzene and normal hexane. Because of the difficulties in separating cyclohexane and benzene by simple fractional distillation due to the close boiling points of the two materials, azeotropic distillation is employed in accordance with this invention. The normal hexane present in the feed to the distillation zone azeotropes with the benzene to effect the separation. In the process of azeotropic distillation, the normal hexane so alters the volatilities of benzene and cyclohexane that satisfactory separation can be made in the fractionation zone. The mol ratio of normal hexane to benzene is at least about 5.7 to 1 in order to obtain the desired substantially pure cyclohexane.

This invention will now be described more fully with reference to the accompanying drawing which shows a schematic flow diagram of a specific embodiment and apparatus representative of the invention.

Five thousand mols per day of benzene (99+ volume percent) is introduced into hydrogenation zone 1 (which includes hydrogen separation and hydrogen recycle) through conduit 4. One thousand mols per day of recycle n-hexane and 14 mols per day of recycle benzene are introduced into conduit 4 through conduit 6. An excess of hydrogen is introduced to hydrogenation zone through conduit 10. In hydrogenation zone 1, the hydrogen is removed from the reaction product and recycled to the catalyst bed. Product recycle comprising 100,000 mols per day cyclohexane, 20,020 mols per day n-hexane, and 280 mols per day benzene is introduced to conduit 4 through conduit 2. The benzene contacts a fixed bed of nickel on kieselguhr catalyst in zone 1 at an average temperature of 450° F., pressure of 435 p.s.i.g., and a liquid hourly space velocity of 2 (measured as cubic feet of liquid per cubic foot of catalyst per hour) to form a product comprising 105,000 mols per day cyclohexane, 294 mols per day benzene, and 21,020 mols per day normal hexane. The product, freed of hydrogen, is withdrawn from hydrogenation zone 1 through conduit 8 and a portion of the product in conduit 8 is passed through conduit 14, cooler 3, conduit 2 and into conduit 4; the remainder of the product, comprising 5,000 mols per day cyclohexane, 1,000 mols per day n-hexane, and 14 mols per day benzene (normal hexane to benzene mol ratio of 70:1) is introduced into fractionation zone 5 through conduit 12. Make-up normal hexane as needed can be added through conduit 40 to conduit 12. Heat is added to fractionation zone 5 by reboiler 7. Fractionation zone 5 is operated at a top temperature of 250° F. at 60 p.s.i.g. Five thousand mols per day of substantially pure (25 parts per million benzene) liquid cyclohexane is withdrawn from fractionation zone 5 through conduit 16. Vapors, comprising mainly benzene and n-hexane, are withdrawn from fractionation zone 5 through conduit 18, passed through condenser 9, and introduced into accumulator 11. Liquid in accumulator 11 is withdrawn through conduit 20 and a portion thereof is introduced into fractionation zone 5, as reflux, through conduit 22. The remaining liquid comprising 1,000 mols per day n-hexane and 14 mols per day benzene is passed through conduits 24 and 26 to recycle the n-hexane and benzene to conduit 6 and subsequently to hydrogenation zone 1. If desired, the portion of the overhead from tower 5 which is to be recycled to the hydrogenation zone can be removed as vapor by way of conduit 28 compressed and passed through conduit 6 into the hydrogenation zone without condensing. To maintain the mole ratio of normal hexane to benzene of 70:1 in zone 5, a sample of the feed in conduit 12 to fractionation zone 5 is passed through line 30, vaporized by means not shown and introduced to analyzer 13. Analyzer 13 is a chromatographic analyzer, such as a Perkin-Elmer Vapor Fractometer Model 184, wherein the concentrations of benzene and normal hexane in the stream are determined. The eluted components appear in the effluent of the analyzer at different intervals. The thermal conductivity of the mixture of each eluted component with the carrier gas is measured and an electrical voltage representative thereof is generated. The ratio of the concentrations of normal hexane and benzene is determined in ratio computer 15 by passing the separate voltage measurements through lines 32 and 34 to separate integrating and holding circuits. The integrated voltage representing the concentration (integrated peak area) of each component is fed to a servo-amplifier, such as described in the Electronic Control Handbook, Botcher and Moulic, Caldwell-Clements, Inc., New York, 1946, page 298 where the ratio of the voltages is determined and a signal representative of the ratio of the concentrations of benzene and normal hexane is passed through line 36 to controller 17. Controller 17, such as described in Bulletin A-710 of the Swartwout Company, Cleveland, Ohio, compares this signal to the signal introduced by line 38 as the set point (desired value of the ratio), and produces therefrom, by conventional controller methods, a pneumatic output signal which manipulates valve 19 in line 5 to adjust the flow of normal hexane to fractionation zone 5 to maintain the ratio of 70:1, normal hexane to benzene.

The ratio of the quantity of recycle through conduit 6 and conduit 2 can be varied to obtain the greatest savings in heat exchange as long as a ratio of at least 5.7:1 of n-hexane to benzene is maintained in conduit 12.

Various valves, pumps, heaters, etc., are not shown nor described herein in order not to complicate the application.

To one skilled in the art it will be evident that many variations and modifications of this invention can be practiced in view of the foregoing disclosure that will come within the spirit and scope of the invention.

That which is claimed is:

1. A method for separating cyclohexane from benzene by fractional distillation comprising forming an azeotrope of said benzene with n-hexane and distilling said azeotrope overhead while removing said cyclohexane as a bottom product of said distillation, the mol ratio of n-hexane to benzene being at least about 5.7 to 1.

2. A method for separating a cyclohexane and benzene-containing mixture into its components comprising distilling said mixture in the presence of n-hexane to form an azeotrope with said benzene, the mol ratio of n-hexane to benzene being at least about 5.7 to 1.

3. A method of separating cyclohexane from benzene in the effluent of a benzene hydrogenation reactor comprising distilling said effluent in the presence of n-hexane to form an azeotrope with said benzene, taking said azeotrope overhead while removing said cyclohexane as a bottom product of the distillation, the mol ratio of n-hexane to benzene during distillation being at least about 5.7 to 1.

4. The method of claim 3 wherein said effluent is continuously analyzed for the concentrations of n-hexane and benzene, the mol ratio of n-hexane to benzene in said effluent is automatically computed, and additional n-hexane is added to said effluent responsive to said computation whereby a mol ratio of n-hexane to benzene of at least about 5.7 to 1 is maintained during distillation.

References Cited by the Examiner

UNITED STATES PATENTS

| 2,934,573 | 4/1960 | Paulsen et al. | 260—667 |
| 2,977,288 | 3/1961 | Cabbage | 260—667 |
| 3,009,002 | 11/1961 | Kron | 260—667 |
| 3,067,126 | 12/1962 | Leas | 260—667 |
| 3,130,240 | 4/1964 | Stark | 260—667 |

DELBERT E. GANTZ, *Primary Examiner.*

S. P. JONES, *Assistant Examiner.*